(12) United States Patent
Hernandez et al.

(10) Patent No.: US 12,479,375 B2
(45) Date of Patent: Nov. 25, 2025

(54) PULL AND PUSH TWO STEPS LOAD FLOOR

(71) Applicant: GM GLOBAL TECHNOLOGY OPERATIONS LLC, Detroit, MI (US)

(72) Inventors: Omar Rene Hernandez, Estado de Mexico (MX); Hector Alejandro Castro, Toluca de Lerdo (MX); Joaquin Hidalgo, Toluca (MX); Jorge Ismael Lopez, El Marques (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 18/313,701

(22) Filed: May 8, 2023

(65) Prior Publication Data
US 2024/0375596 A1    Nov. 14, 2024

(51) Int. Cl.
  *B60R 13/01*    (2006.01)
  *B60R 5/04*    (2006.01)
  *B62D 65/14*    (2006.01)

(52) U.S. Cl.
  CPC .............. *B60R 13/013* (2013.01); *B60R 5/04* (2013.01); *B60R 2013/018* (2013.01); *B62D 65/14* (2013.01)

(58) Field of Classification Search
  CPC ........... B60R 3/02; B60R 5/04; B60R 13/013; B60R 2013/018; B62D 25/2054; B62D 65/14
  See application file for complete search history.

(56) References Cited

U.S. PATENT DOCUMENTS 6,918,734 B2 * 7/2005 Nick .............. B60P 1/003
                                      414/629
7,401,716 B2 * 7/2008 Svenson ......... B60R 5/045
                                      224/42.32
(Continued)

FOREIGN PATENT DOCUMENTS

DE    102009025987 A1    4/2010
DE    102015111703 A1    2/2016
(Continued)

OTHER PUBLICATIONS

DE 102007042371 A1 (Year: 2009).*
DE Office Action for Appln No. 10 2023 127 031.1 dated Oct. 15, 2024, 7 pages.

*Primary Examiner* — Lori Lyjak
(74) *Attorney, Agent, or Firm* — CANTOR COLBURN LLP (57) ABSTRACT

Aspects of the disclosure include a pull and push two steps load floor system. An exemplary pull and push two steps load floor system can include a first two-track transition support feature including a first track having an open end and a second track having an open end and a second two-track transition support feature including a third track having an open end and a fourth track having an open end. The load floor system can further include a load floor having a hinge and four pins positioned such that the load floor can be coupled to the first two-track transition support feature and to the second two-track transition support feature by placing the four pins into respective tracks of the first two-track transition support feature and the second two-track transition support feature through the respective open ends.

20 Claims, 6 Drawing Sheets

(56) References Cited

U.S. PATENT DOCUMENTS

| | | | |
|---|---|---|---|
| 9,090,210 B2* | 7/2015 | Demma | B60R 5/04 |
| 9,827,914 B2 | 11/2017 | Murray et al. | |
| 10,787,128 B2* | 9/2020 | Ngo | B60R 5/044 |
| 2015/0054299 A1* | 2/2015 | Yoshizawa | B60R 5/045 |
| | | | 296/37.16 |

FOREIGN PATENT DOCUMENTS

| | | |
|---|---|---|
| EP | 1728684 A1 | 12/2006 |
| EP | 2008071 A1 | 12/2008 |
| EP | 2048031 A1 | 4/2009 |
| EP | 2899070 A1 | 7/2015 |
| FR | 2890636 A1 | 3/2007 |
| FR | 2949100 A1 | 2/2011 |
| JP | 2007091105 A | 4/2007 |
| WO | 2007115916 A1 | 10/2007 |

\* cited by examiner

PULL AND PUSH TWO STEPS LOAD FLOOR

INTRODUCTION

The subject disclosure relates to vehicle storage solutions and cargo compartments, and particularly to a pull and push two steps load floor.

Vehicle storage and cargo capacity refers to the regions (volumes) within a vehicle that are designed or otherwise designated for storing and transporting various types of cargo, such as the luggage, groceries, equipment, and other belongings of a user of the vehicle. In many vehicles, the majority of the storage and cargo space is located in the trunk(s), which can be a fully or partially separate enclosed compartment at the front and/or rear of the vehicle. Trunks can be flexibly designed, and can include, for example, a pass-through opening to the main cabin area (e.g., beyond the rear seats) for longer items like skis or fishing rods. The design and capacity of a vehicle cargo space can vary greatly depending on the type and size of the vehicle, as well as its intended use or purpose.

One type of vehicle storage solution is the two steps load floor. A two steps load floor typically consists of a multi-level cargo floor that is divided into two or more sections, with each section being at a different height or level for easier loading and unloading of cargo. The so-called "two steps" load floor refers to the fact that the different levels or sections of the load floor were historically designed to accommodate the varying heights of a towed trailer and a vehicle's own cargo area. The two steps load floor allows for a more even and level surface for loading and unloading items, including those that may be taller or bulkier, such as furniture, appliances, or recreational equipment.

A two steps load floor design may include features such as removable panels, adjustable platforms, and folding sections, which can be configured in a variety of different ways to suit the specific needs of the cargo being loaded and/or the trailer being towed. The two steps load floor can provide greater flexibility and convenience for organizing and securing cargo of various sizes in a vehicle's cargo area.

SUMMARY

In one exemplary embodiment a vehicle includes a cargo compartment having a pull and push two steps load floor system. The pull and push two steps load floor system can include a first two-track transition support feature including a first track having an open end and a second track having an open end and a second two-track transition support feature including a third track having an open end and a fourth track having an open end. The pull and push two steps load floor system can further include a load floor having a hinge and four pins positioned such that the load floor can be coupled to the first two-track transition support feature and to the second two-track transition support feature by placing the four pins into respective tracks of the first two-track transition support feature and the second two-track transition support feature through the respective open ends.

In addition to one or more of the features described herein, in some embodiments, the hinge is a living hinge having a thickness that is less than a thickness of an upper portion and a thickness of a lower portion of the load floor.

In some embodiments, the second track and the fourth track each include an upper track portion, a lower track portion, and a middle track portion between the upper track portion and the lower track portion. In some embodiments, the upper track portions are coplanar to the first track and the third track, the middle track portions descend from the upper track portions at a first angle A, and the lower track portions descend from the middle track portion at a second angle B greater than the first angle A.

In some embodiments, the first, second, third, and fourth tracks include a first terminal pin configuration for the four pins and a second terminal pin configuration for the four pins. In some embodiments, the load floor can be moved to an upper load floor position by placing the four pins into the first terminal pin configuration. In some embodiments, the load floor can be moved to a lower load floor position by placing the four pins into the second terminal pin configuration.

In some embodiments, the pull and push two steps load floor system includes a storage bin having a raised portion configured to support an end of the load floor when the load floor is in an upper load floor position.

In another exemplary embodiment a pull and push two steps load floor system can include a first two-track transition support feature including a first track having an open end and a second track having an open end and a second two-track transition support feature including a third track having an open end and a fourth track having an open end. The load floor system can further include a load floor having a hinge and four pins positioned such that the load floor can be coupled to the first two-track transition support feature and to the second two-track transition support feature by placing the four pins into respective tracks of the first two-track transition support feature and the second two-track transition support feature through the respective open ends.

In yet another exemplary embodiment a method can include providing a first two-track transition support feature including a first track having an open end and a second track having an open end and providing a second two-track transition support feature including a third track having an open end and a fourth track having an open end. The method can further include coupling a load floor having a hinge and four pins to the first two-track transition support feature and to the second two-track transition support feature by placing the four pins into respective tracks of the first two-track transition support feature and the second two-track transition support feature through the respective open ends.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
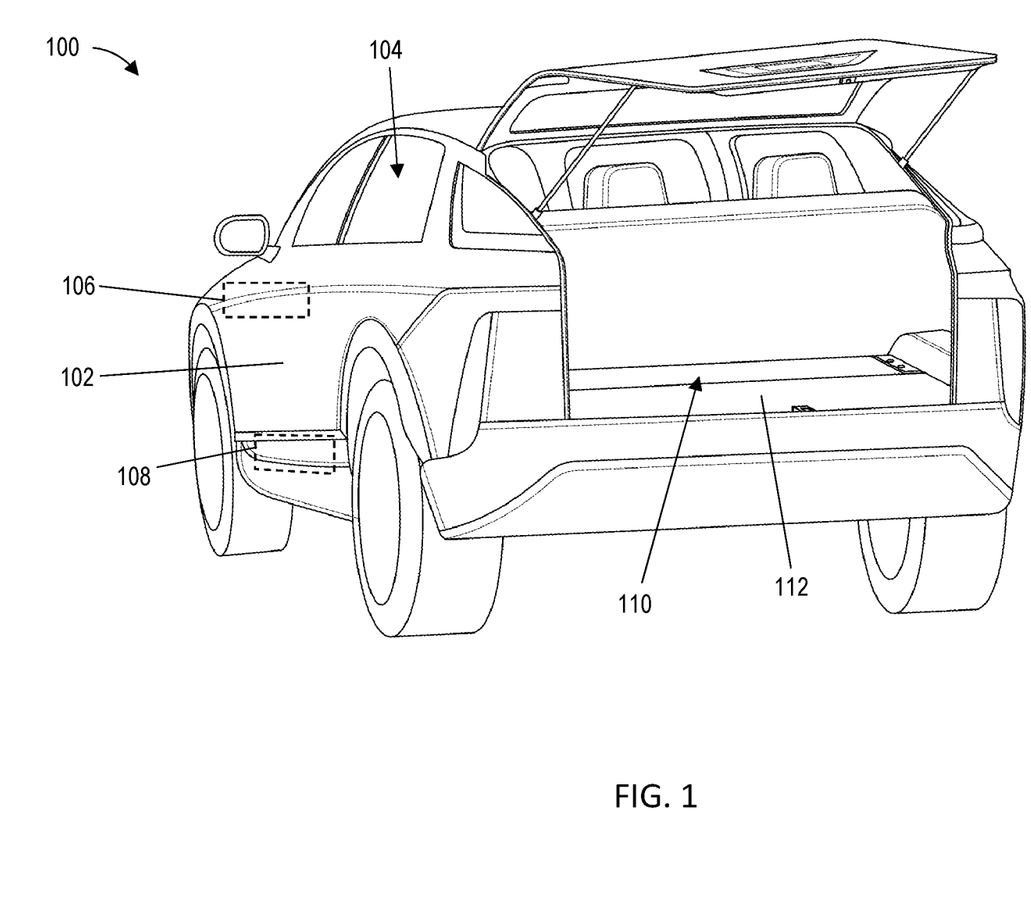
FIG. 1 is a vehicle configured in accordance with one or more embodiments.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood of the vehicle 100), a battery pack 108 (shown by projection under the vehicle 100), and a cargo compartment 110.

As will be detailed herein, the cargo compartment 110 can include a pull and push two steps load floor system 112 (referred to herein as load floor system 112). The load floor system 112 is shown in FIG. 1 for ease of illustration and discussion only. It should be understood that the configuration, location, size, number, arrangement, etc., of the load floor system 112 is not meant to be particularly limited, and all such configurations are within the contemplated scope of this disclosure. For example, while the present disclosure is discussed primarily in the context of a rear compartment storage solution (e.g., within a rear trunk, hatchback, etc. of the vehicle 100), the load floor system 112 need not be so limited and can be incorporated in other regions of the vehicle 100 (e.g., a front trunk, a glove compartment, etc.). Moreover, all aspects of the load floor system 112 described herein can be similarly incorporated within any system (vehicle, building, or otherwise) having a multi-level storage solution (e.g., a drawer, a chest, a cabinet, a loading dock or bay, a toolbox, etc.), and all such configurations and applications are within the contemplated scope of this disclosure.

As discussed previously, two steps load floors are an excellent storage solution that can allow a user to flexibly relocate a load floor between two different load floor positions (levels), thereby accommodating a variety of storage needs. Unfortunately, current load floor solutions are not particularly intuitive for customers, as most of configurations require some combination of lifting and removing the load floor to change the load floor from position "A" to position "B". Moreover, the load floor often needs to be grabbed from the front edge, creating a cantilever action that requires the user to reach across the length of the load floor. To mitigate these issues, some load floor configurations leverage a sill-plate so that the user is not forced to provide all of the lifting weight needing to transition the load floor.

Due to operational complexity, the transition procedure (i.e., moving a load floor from a position "A" to a position "B") is often explained in detail within a user manual of the vehicle. This solution is not ideal, as the user must know to look within the user manual and may not even realize that the load floor includes a second function. In addition, current load floor solutions for the rear compartment require collaboration between the rear compartment and the quarter lower garnishes to be successful, as the quarter lower garnishes provide support to some of the load floor areas. Quarter lower garnishes, however, were not originally designed to meet this requirement and a full two steps load floor solution can require a redesign of the quarter lower garnish.

This disclosure introduces a new two steps load floor system that leverages an intuitive pull and push mechanism for transitioning between two load floor positions. To operate the pull and push mechanism, a user need only pull in a first (rear) direction and then push in a second (front) direction to change the load floor level. Notably, these are smooth movements that simulate one continuous sliding movement for the user and do not require the user to remove the load floor.

In some embodiments, the load floor system includes a pair of two-track transition support features. In some embodiments, the transition support features can be attached to each front corner of a load floor. In some embodiments, the load floor includes four pins, each pin configured to move within a specific one of the four tracks of the pair of transition support features. The tracks are designed to provide two terminal pin configurations, one for the first load floor level and one for the second load floor level. By moving the pins within the respective tracks between the two terminal pin configurations, a user can easily transition the load floor between the two levels.

Two steps load floors having a pull and push mechanism constructed in accordance with one or more embodiments offer several technical advantages over other load floor layouts. In short, the load floors described herein can be easily transitioned between load floor levels without requiring the user to remove the load floor or to lift the front edge of the load floor via a cantilever action. Advantageously, load floors described herein operate independently of the quarter lower garnish and do not require sill-plate support. In addition, load floors described herein can meet a range of loading requirements, such as knee load and retention and can be efficiently packaged within a storage compartment.

Figure 2A:
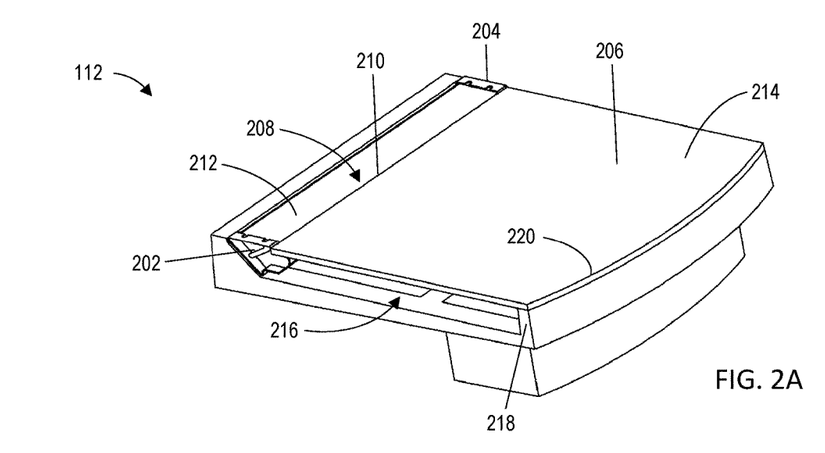
FIG. 2A is a view of a load floor system with a load floor in an upper position in accordance with one or more embodiments.
Figure 2B:
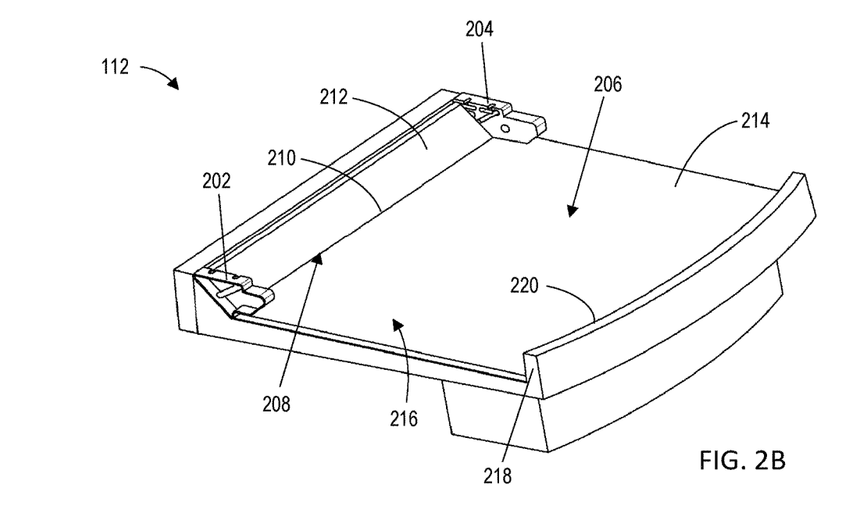
FIG. 2B is a view of a load floor system with a load floor in a lower position in accordance with one or more embodiments.

FIGS. 2A and 2B illustrate views of a load floor system 112 in accordance with one or more embodiments. The load floor system 112 can be coupled to or otherwise integrated within a cargo compartment of a vehicle (e.g., the cargo compartment 110 of the vehicle 100 of FIG. 1), although other storage applications (for vehicles, structures, or otherwise) are within the contemplated scope of this disclosure. The following sections describe the load floor system 112 in the context of the vehicle 100 for ease of discussion and illustration only.

The load floor system 112 can include a first two-track transition support feature 202, a second two-track transition support feature 204, and a load floor 206. In some embodiments, the load floor 206 includes a hinge 208. In some embodiments, the hinge 208 includes a living hinge. As used herein, a "living hinge" refers to a hinge made of a same material as the two pieces it connects. The hinge 208 is not meant to be particularly limited, but can include, for example, a relatively thin and flexible portion 210 positioned between a first portion 212 and a second portion 214 of the load floor 206. As used herein, the "relatively thin" and flexible portion 210 refers to the portion 210 having a thickness that is less than a thickness of the first portion 212 and a thickness of the second portion 214 of the load floor 206. The first two-track transition support feature 202 and the second two-track transition support feature 204 are discussed in greater detail with respect to FIG. 3A. The load floor 206 is discussed in greater detail with respect to FIG. 3B.

FIG. 2A depicts the load floor system 112 with the load floor 206 in an upper position (i.e., a first level, or position "A"). As shown in FIG. 2A, the load floor system 112 can further include a storage bin 216 over which the load floor 206 lies when in the upper position. In some embodiments, the load floor system 112 and/or the storage bin 216 includes a raised portion 218 configured to support an end 220 of the load floor 206 when in the upper position.

FIG. 2B depicts the load floor system 112 with the load floor 206 in a lower position (i.e., a second level, or position "B"). As shown in FIG. 2B, the load floor 206 can define a bottom surface of the storage bin 216 when in the lower position. In some embodiments, the raised portion 218 and/or the load floor 206 are configured such that the end 220 of the load floor 206 fits against the raised portion 218 when in the lower position.

Figure 3A:
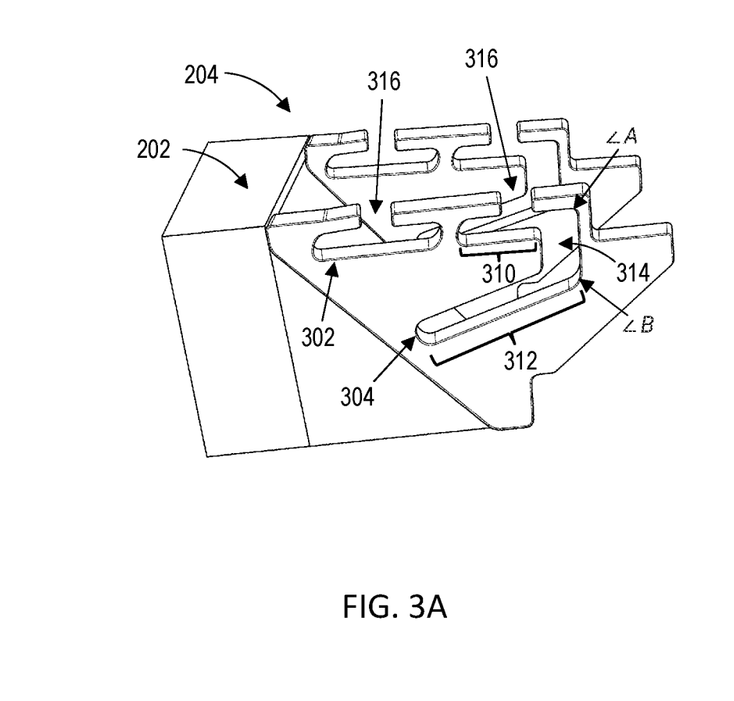
FIG. 3A is a view of a first two-track transition support feature and a second two-track transition support feature in accordance with one or more embodiments.

FIG. 3A illustrates a view of the first two-track transition support feature 202 and the second two-track transition support feature 204 in accordance with one or more embodiments. For ease of illustration and discussion, various elements of the first two-track transition support feature 202 and the second two-track transition support feature 204 are described solely with respect to the first two-track transition support feature 202. It should be understood, however, that the second two-track transition support feature 204 can include corresponding elements. That is, the first two-track transition support feature 202 and the second two-track transition support feature 204 can be substantially identical.

In some embodiments, the first two-track transition support feature 202 includes a first track 302 and a second track 304 configured and arranged as shown. In some embodiments, the second track 304 includes an upper track portion 310, a lower track portion 312, and a middle track portion 314 between the upper track portion 310 and the lower track portion 312. For ease of illustration, only the upper track portion 310, the middle track portion 314, and the lower track portion 312 for the second track 304 is separately indicated. In some embodiments, the upper track portion 310 for the second track 304 is coplanar (or substantially coplanar within tooling limits) to the first track 302.

In some embodiments, the middle track portion 314 for the second track 304 descends from the upper track portion 310 at a first angle A and the lower track portion 312 descends from the middle track portion 314 at a second angle B greater than the first angle A. As shown in FIG. 3A, the first angle A is between about 70 and 110 degrees, for example 90 degrees, although other configurations are within the contemplated scope of this disclosure. As further shown in FIG. 3A, the second angle B is between about 90 and 160 degrees, for example 120 degrees, although other configurations are within the contemplated scope of this disclosure.

Figure 3B:
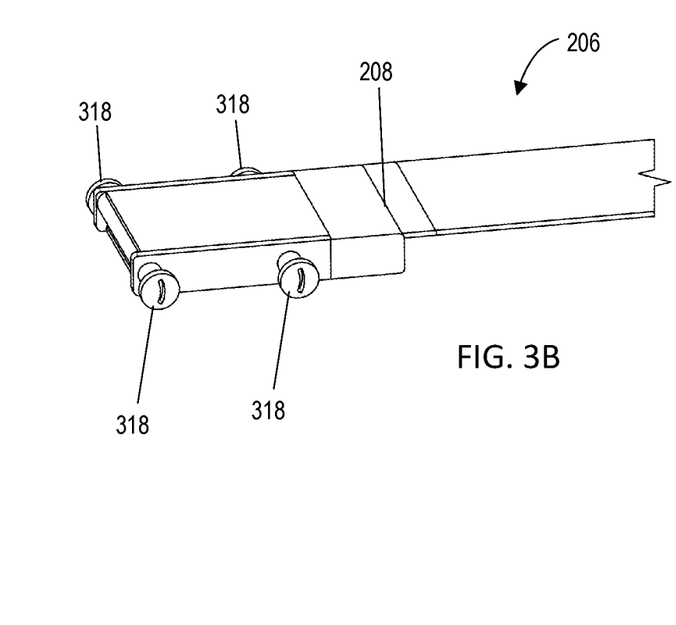
FIG. 3B is a view of a load floor having four pins for insertion into tracks of a two-track transition support feature in accordance with one or more embodiments.

In some embodiments, each of the tracks 302 and 304 includes an open end 316. In some embodiments, each open end 316 is sized to accommodate a pin 318 of the load floor 206. FIG. 3B illustrates a view of the load floor 206 having four pins 318 configured for insertion into the tracks 302 and 304 via the open ends 316. In some embodiments, the four pins 318 include a first, inner diameter that is less than a width of the open ends 316 and a second, outer diameter that is more than the width of the open ends 316 and a height of the tracks 302 and 304. In this manner, inserting the four pins 318 into the respective open ends 316 serves to couple the load floor 206 to the first two-track transition support feature 202 and the second two-track transition support feature 204.

Figure 4A:
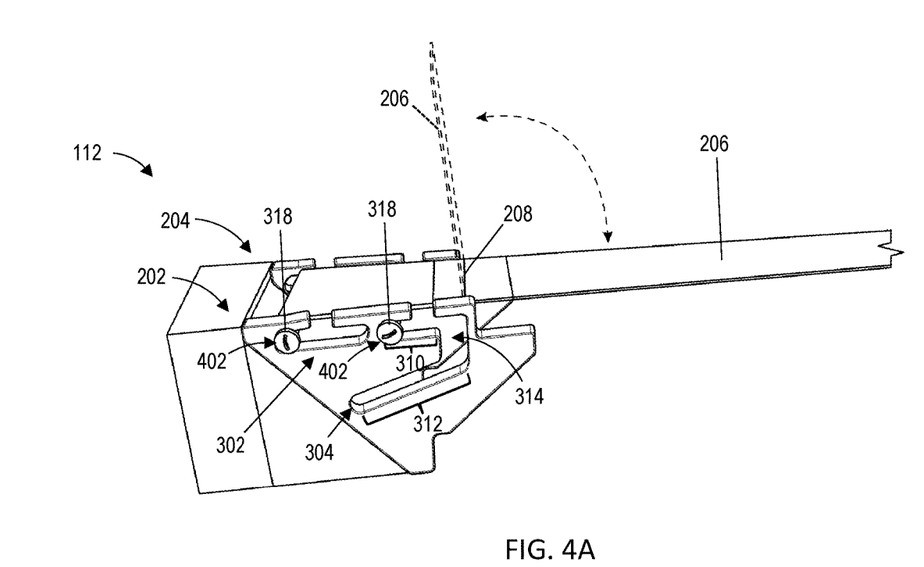
FIG. 4A is a view of a load floor system with a load floor in an upper position in accordance with one or more embodiments.

FIG. 4A depicts the load floor system 112 with the load floor 206 in an upper position (i.e., a first level, or position "A"). As shown in FIG. 4A, the tracks 302 and 304 are designed to provide an upper position terminal pin configuration for two of the four pins 318. In some embodiments, to set the position "A", the load floor 206 can be pushed in a direction towards the first two-track transition support feature 202 and the second two-track transition support feature 204 until the pins 318 reach respective first terminal positions 402 in the tracks 302 and 304 (as shown in FIG. 4A).

As further shown in FIG. 4A, in some embodiments, the hinge 208 is configured to allow the load floor 206 to be positioned in a first orientation (as shown, in a horizontal orientation) and in a second orientation (as shown via projection, in a vertical orientation) when the load floor 206 is in position "A". In this manner, the load floor 206 can be manipulated to expose or cover an underlying cargo area, such as, for example, the storage bin 216 in FIG. 2A.

Figure 4B:
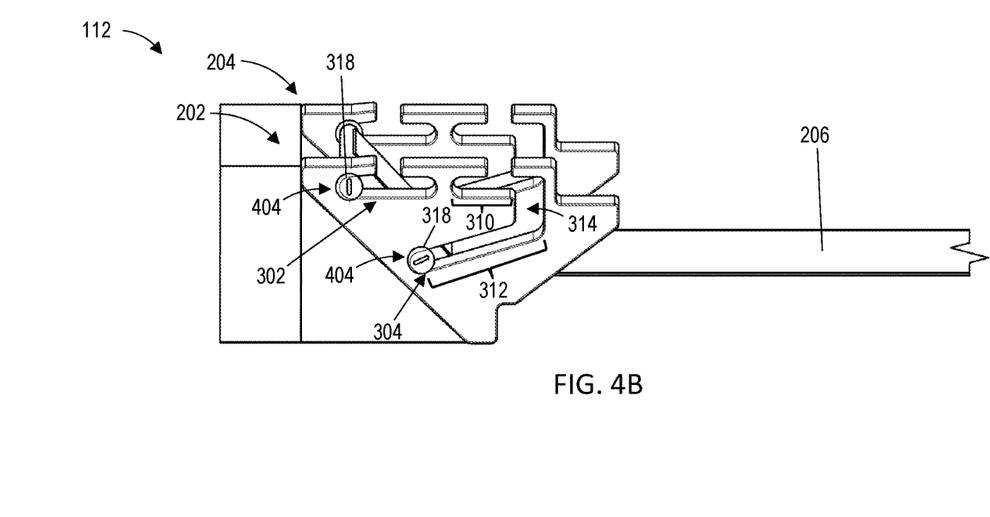
FIG. 4B is a view of a load floor system with a load floor in a lower position in accordance with one or more embodiments.

FIG. 4B depicts the load floor system 112 with the load floor 206 in a lower position (i.e., a second level, or position "B"). As shown in FIG. 4B, the tracks 302 and 304 are designed to provide a lower position terminal pin configuration for two of the four pins 318. In some embodiments, to set the position "B", the load floor 206 can be pulled in a direction away from the first two-track transition support feature 202 and the second two-track transition support feature 204 until the pins 318 in the second track 304 and the fourth track 308 drop down into the lower track portion 312. The load floor 206 can then pushed towards the first two-track transition support feature 202 and the second two-track transition support feature 204 until the pins 318 reach respective second terminal positions 404 in the tracks 302, 304, 306, and 308 (as shown in FIG. 4B).

To return to position "A" (refer to FIG. 4A), the steps are simply reversed. That is, the load floor 206 can be pulled away from the first two-track transition support feature 202 and the second two-track transition support feature 204 and the load floor 206 can be lifted to put the pins 318 into the upper track portion 310. Once the pins 318 are within the upper track portion 310, the load floor 206 can be pushed in a direction towards the first two-track transition support feature 202 and the second two-track transition support feature 204 until the pins 318 reach the respective first terminal positions 402 in the tracks 302, 304, 306, and 308 (as shown in FIG. 4A).

Figure 5A:
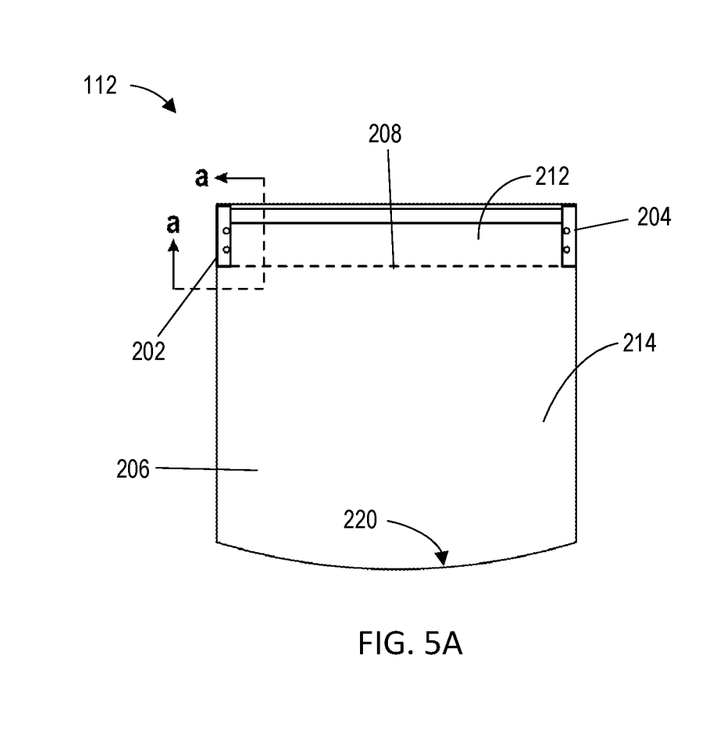
FIG. 5A is a top-down view of a load floor system in accordance with one or more embodiments.
Figure 5B:
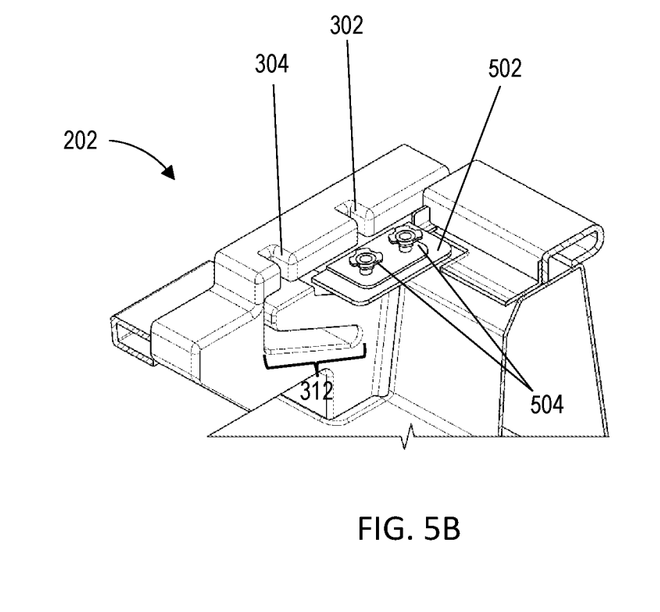
FIG. 5B is a view of the load floor system along the section a-a in FIG. 5A in accordance with one or more embodiments.

FIG. 5A illustrates a top-down view of a load floor system 112 in accordance with one or more embodiments. FIG. 5B illustrates a view of the load floor system 112 along the section a-a in FIG. 5A in accordance with one or more embodiments. In some embodiments, the first two-track transition support feature 202 and the second two-track transition support feature 204 (not separately shown) includes a load floor bracket 502. In some embodiments, the load floor bracket 502 includes one or more anchors 504 (also referred to as pins).

In some embodiments, the load floor bracket 502 extends from the first two-track transition support feature 202 (or the second two-track transition support feature 204) such that the load floor 206 can partially rest on the load floor bracket 502 when the pins 318 are inserted into the tracks 302, 304, 306, and 308 (refer to FIGS. 4A and 4B). In some embodiments, the one or more anchors 504 extend into recesses (not separately shown) in the load floor 206 to secure the load floor 206 to the load floor bracket 502. In some embodiments, the load floor bracket 502 is configured to support a weight of the load floor 206. In some embodiments, the load floor bracket 502 and the raised portion 218 of the storage bin 216 (refer to FIG. 2A) are configured to support, together, the weight of the load floor 206.

Figure 6:
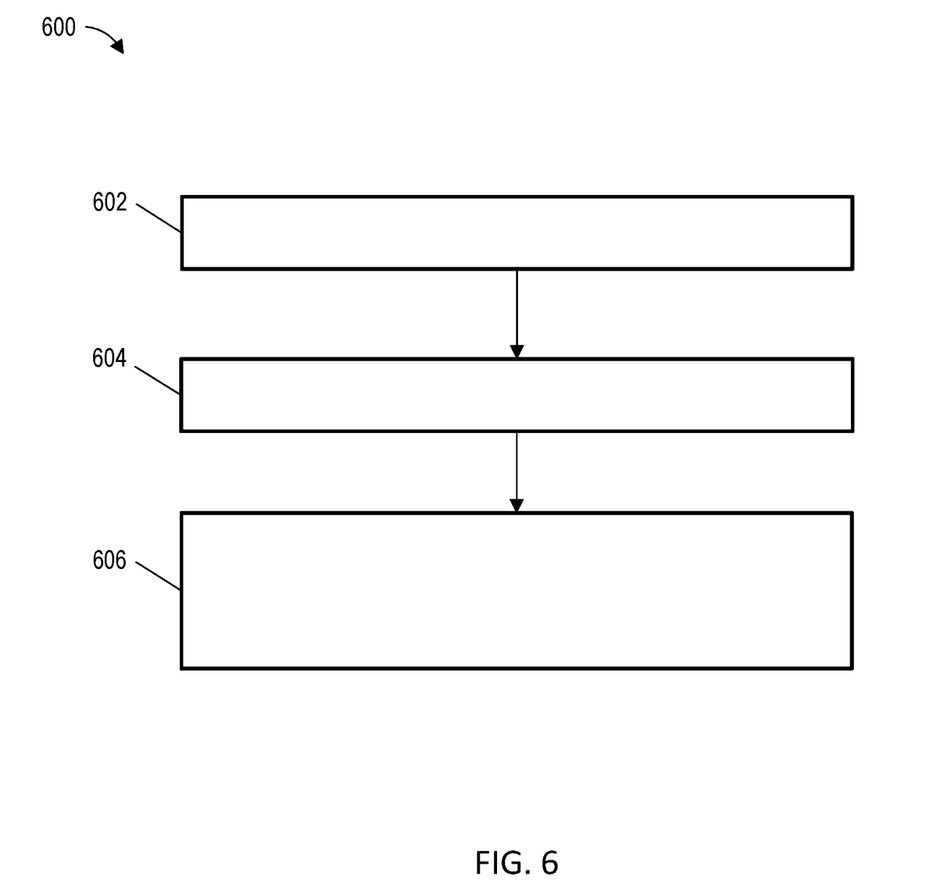
FIG. 6 is a flowchart in accordance with one or more embodiments.

Referring now to FIG. 6, a flowchart 600 for a two steps load floor having a pull and push mechanism constructed in accordance with one or more embodiments is generally shown according to an embodiment. The flowchart 600 is described in reference to FIGS. 1 to 5B and may include additional steps not depicted in FIG. 6. Although depicted in a particular order, the blocks depicted in FIG. 6 can be rearranged, subdivided, and/or combined.

At block 602, a first two-track transition support feature is provided. The first two-track transition support feature includes a first track having an open end and a second track having an open end. At block 604, a second two-track transition support feature is provided. The second two-track transition support feature includes a third track having an open end and a fourth track having an open end.

At block 606, a load floor is coupled to the first two-track transition support feature and to the second two-track transition support feature. In some embodiments, the load floor includes a hinge and four pins. In some embodiments, the load floor is coupled to the first two-track transition support feature and to the second two-track transition support feature by placing the four pins into respective tracks of the first two-track transition support feature and the second two-track transition support feature through the respective open ends.

In some embodiments, the hinge is a living hinge having a thickness that is less than a thickness of an upper portion and a thickness of a lower portion of the load floor.

In some embodiments, the second track and the fourth track each include an upper track portion, a lower track portion, and a middle track portion between the upper track portion and the lower track portion. In some embodiments, the upper track portions are coplanar to the first track and the third track, the middle track portions descend from the upper track portions at a first angle A, and the lower track portions descend from the middle track portion at a second angle B greater than the first angle A.

In some embodiments, the first, second, third, and fourth tracks include a first terminal pin configuration for the four pins and a second terminal pin configuration for the four pins. In some embodiments, the load floor can be moved to an upper load floor position by placing the four pins into the first terminal pin configuration and the load floor can be moved to a lower load floor position by placing the four pins into the second terminal pin configuration.

In some embodiments, the pull and push two steps load floor system includes a storage bin having a raised portion configured to support an end of the load floor when the load floor is in an upper load floor position.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
    a cargo compartment comprising a pull and push two steps load floor system, the pull and push two steps load floor system comprising:
        a first two-track transition support feature comprising a first track having an open end and a second track having an open end;
        a second two-track transition support feature comprising a third track having an open end and a fourth track having an open end; and
        a load floor comprising a hinge and four pins positioned such that the load floor can be coupled to the first two-track transition support feature and to the second two-track transition support feature by placing the four pins into respective tracks of the first two-track transition support feature and the second two-track transition support feature through the respective open ends.

2. The vehicle of claim 1, wherein the hinge comprises a living hinge having a thickness that is less than a thickness of an upper portion and a thickness of a lower portion of the load floor.

3. The vehicle of claim 1, wherein the second track and the fourth track each include an upper track portion, a lower track portion, and a middle track portion between the upper track portion and the lower track portion.

4. The vehicle of claim 3, wherein the upper track portions are coplanar to the first track and the third track, the middle track portions descend from the upper track portions at a first angle A, and the lower track portions descend from the middle track portion at a second angle B greater than the first angle A.

5. The vehicle of claim 1, wherein the first, second, third, and fourth tracks comprise a first terminal pin configuration for the four pins and a second terminal pin configuration for the four pins.

6. The vehicle of claim 5, wherein the load floor can be moved to an upper load floor position by placing the four pins into the first terminal pin configuration and the load floor can be moved to a lower load floor position by placing the four pins into the second terminal pin configuration.

7. The vehicle of claim 1, further comprising a storage bin having a raised portion configured to support an end of the load floor when the load floor is in an upper load floor position.

8. A pull and push two steps load floor system comprising:
   a first two-track transition support feature comprising a first track having an open end and a second track having an open end;
   a second two-track transition support feature comprising a third track having an open end and a fourth track having an open end; and
   a load floor comprising a hinge and four pins positioned such that the load floor can be coupled to the first two-track transition support feature and to the second two-track transition support feature by placing the four pins into respective tracks of the first two-track transition support feature and the second two-track transition support feature through the respective open ends.

9. The pull and push two steps load floor system of claim 8, wherein the hinge comprises a living hinge having a thickness that is less than a thickness of an upper portion and a thickness of a lower portion of the load floor.

10. The pull and push two steps load floor system of claim 8, wherein the second track and the fourth track each include an upper track portion, a lower track portion, and a middle track portion between the upper track portion and the lower track portion.

11. The pull and push two steps load floor system of claim 10, wherein the upper track portions are coplanar to the first track and the third track, the middle track portions descend from the upper track portions at a first angle A, and the lower track portions descend from the middle track portion at a second angle B greater than the first angle A.

12. The pull and push two steps load floor system of claim 8, wherein the first, second, third, and fourth tracks comprise a first terminal pin configuration for the four pins and a second terminal pin configuration for the four pins.

13. The pull and push two steps load floor system of claim 12, wherein the load floor can be moved to an upper load floor position by placing the four pins into the first terminal pin configuration and the load floor can be moved to a lower load floor position by placing the four pins into the second terminal pin configuration.

14. The pull and push two steps load floor system of claim 8, further comprising a storage bin having a raised portion configured to support an end of the load floor when the load floor is in an upper load floor position.

15. A method comprising:
   providing a first two-track transition support feature comprising a first track having an open end and a second track having an open end;
   providing a second two-track transition support feature comprising a third track having an open end and a fourth track having an open end; and
   coupling a load floor comprising a hinge and four pins to the first two-track transition support feature and to the second two-track transition support feature by placing the four pins into respective tracks of the first two-track transition support feature and the second two-track transition support feature through the respective open ends.

16. The method of claim 15, wherein the hinge comprises a living hinge having a thickness that is less than a thickness of an upper portion and a thickness of a lower portion of the load floor.

17. The method of claim 15, wherein the second track and the fourth track each include an upper track portion, a lower track portion, and a middle track portion between the upper track portion and the lower track portion.

18. The method of claim 17, wherein the upper track portions are coplanar to the first track and the third track, the middle track portions descend from the upper track portions at a first angle A, and the lower track portions descend from the middle track portion at a second angle B greater than the first angle A.

19. The method of claim 15, wherein the first, second, third, and fourth tracks comprise a first terminal pin configuration for the four pins and a second terminal pin configuration for the four pins.

20. The method of claim 19, wherein the load floor can be moved to an upper load floor position by placing the four pins into the first terminal pin configuration and the load floor can be moved to a lower load floor position by placing the four pins into the second terminal pin configuration.

* * * * *